United States Patent Office 3,285,648
Patented Nov. 15, 1966

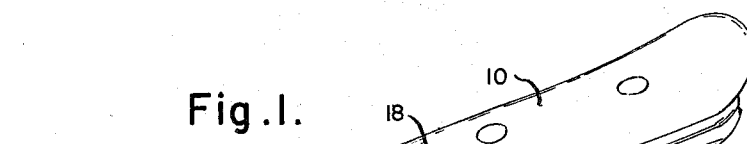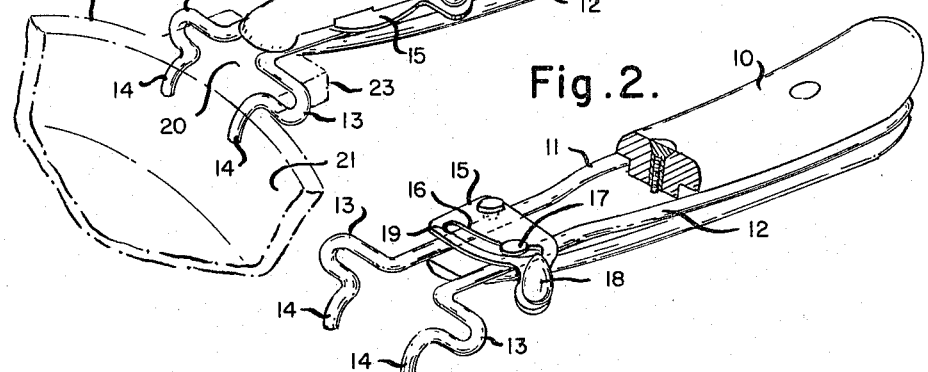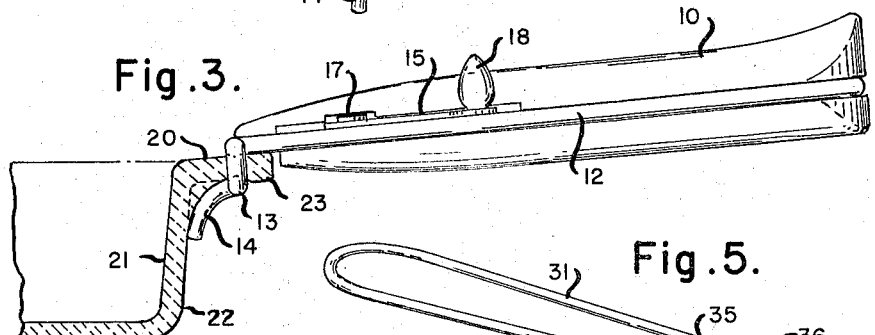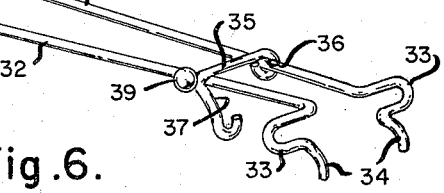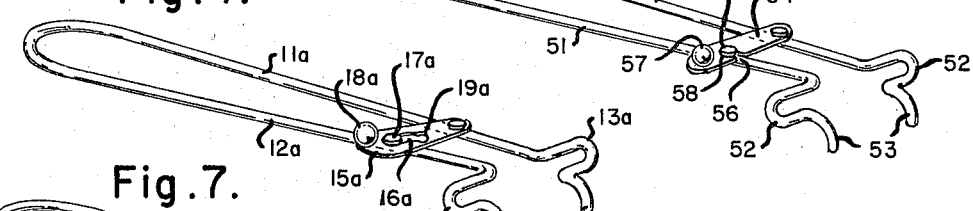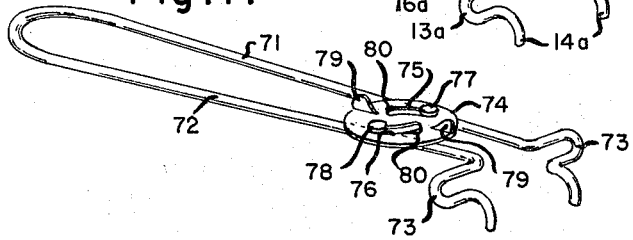

3,285,648
DETACHABLE HANDLES
Vaughn K. Pryce, 417 4th St., Derry, Pa.
Filed Jan. 18, 1965, Ser. No. 426,311
3 Claims. (Cl. 294—16)

This invention relates to detachable handles and particularly to a handle adapted to be removably applied to a fry pan, casserole or like cooking vessel having one or more outwardly extending lugs or lips. There are on the market a variety of glass and ceramic cooking vessels which have a flat bottom and an upwardly extending flange defining the body of the vessel which flange has on its upper edge at least one outwardly extending lug or lip. Such cooking vessels are made and sold by Corning, Anchor Hocking and Owens-Illinois glass companies.

It is essential in a detachable handle for the service here contemplated, that the handle tightly engage the lug or lip without scoring or otherwise damaging the glass or ceramic surface or otherwise setting up strains. It is also essential that the handle hold the vessel sufficiently tightly to permit its being turned from the horizontal to the vertical plane without loss of engagement.

I have invented a detachable handle which when once connected to the cooking vessel cannot be accidentally disconnected or removed. The handle of my invention will not score or otherwise injure the glass surfaces of the lug or lip. A very significant feature of my invention is that it will vary the grasping opening to accommodate reasonable variations in the width of the lug so that the lug is always firmly engaged. This feature is unique in the structure of my invention and cannot be accomplished by any detachable handle presently available to my knowledge.

In a perferred embodiment of my invention I provide a detachable handle of the character described comprising a hand gripping portion including spaced members, a pair of gripping jaws integral with one end of the spaced members of the gripping portion, said gripping jaws having opposed elongated U-shaped members opening toward each other and adapted to be moved toward each other over the edges of the lug between the body of the vessel and the depending lip on the lug; cam means pivoted on one spaced member, a cam engaging member on the other spaced member adapted to engage the cam means, said cam means having a portion extending between said spaced members and adapted to be moved relatively thereto to move the spaced members toward each other and the gripping jaws from a first position in which said jaws are spaced apart to pass over the vessel lug to a second position in which the gripping jaws engage the lug. Preferably the cam means is pivoted on one spaced member and carries a cam slot engaging the cam engaging member on the other spaced member, said cam slot having a locking portion at the point where the spaced members are closest together.

In the foregoing general description I have set out certain objects, advantages and purposes of my invention. Other objects, advantages and purposes of my invention will be apparent from a consideration of the following description and the accompanying drawings in which FIGURE 1 is an isometric view of a preferred embodiment of the detachable handle according to my invention in locking engagement with a cooking vessel;

FIGURE 2 is an isometric view partly in section of a handle according to my invention showing the handle in unlocked position;

FIGURE 3 is a side elevational view of the handle shown in FIGURE 1;

FIGURE 4 is an isometric view of a second embodiment of my invention;

FIGURE 5 is an isometric view of a third embodiment of my invention;

FIGURE 6 is an isometric view of a fourth embodiment of my invention; and

FIGURE 7 is an isometric view of a fifth embodiment of my invention.

Referring to the drawings I have illustrated a hand gripping portion 10 carrying spaced resilient members 11 and 12 in the form of an elongated U-shaped rod or wire surrounding the gripping portion 10. A U-shaped gripping jaw 13 is provided on each of the members 11 and 12, each jaw opening toward the other and having a downturned member 14 extending angularly away from the hand gripping portion.

A cam plate 15 is pivoted on one member 11 and is provided with a cam slot 16 engaging a cam engaging member 17 on the other member 12. A handle 18 on the cam plate adjacent the hand gripping portion 10 is adapted to move the cam plate from a position in which the jaws 13 are spaced apart a maximum distance to a second position in which the jaws are brought close together and the cam engaging member is brought into a locking notch 19 in the cam plate.

The apparatus of FIGURE 1 is used as follows: the gripping jaws 13, in the open position are moved over a lug 20 extending from the upper edge of the side flange 21 of a fry pan 22 or other cooking vessel. The one leg of the U-shaped gripping jaw lies on top of lug 20. The other leg lies beneath lug 20 behind locking lip 23 on the end of the lug with the downturned members 14 bearing against the side flange 21 of the cooking vessel. The cam plate 15 is rotated by handle 18 from the open position (See FIG 2) to the closed position (See FIG. 1) which brings the resilient members 11 and 12 together and with them the U-shaped gripping jaws 13, which tightly engage the lug 20. When the cam 20 is rotated to fully locked position with the cam engaging member in locking notch 19 of the cam slot, the members 11 and 12 are under tension thus holding the lug 20 tightly between the gripping jaws 13.

In the embodiment illustrated in FIGURE 4 I have shown a structure identical with that of FIGURES 1 through 3 except for the omission of the hand gripping member 10. Like parts are identified with like numbers to which the suffix "a" has been added. The operation of this embodiment is identical with that of FIGURES 1–3.

In FIGURE 5 I have illustrated an embodiment in which resilient members 31 and 32 of an elongated U-shaped member form the hand gripping portion of the handle of my invention. A U-shaped gripping jaw 33 identical with jaw 13 of FIGURES 1–3 is provided on the end of members 31 and 32, each jaw having a like downturned member 34. A cam member 35 is pivoted on member 31 intermediate its ends and is held in position by a pivot pin or stop 36. A cam surface 37 on the cam member 35 engages the other member 32 so that in a first position the members 31 and 32 are spaced apart a maximum distance with the area outlined by the cam surface and in a second position the members 31 and 32 are brought together with the gripping jaws engaging the lug 20 of a cooking vessel precisely as in FIGURES 1–3. The cam member is provided with a thumb handle 39 which permits the cam to be moved in a vertical planef rom the first to second position and return.

In FIGURE 6 I have illustrated an embodiment of my invention providing two spaced resilient members 50 and 51, each having a U-shaped gripping jaw 52 and downturned end 53 identical with jaws 13 and end 14 of FIGURES 1–3. A cam locking plate 54 is pivoted on end member 50 and a cam engaging pin 55 is fixed to the other member 51. An open ended cam and lock groove 56 is formed in the cam plate 54.

To use the handle of the foregoing embodiment, the U-shaped gripping jaws are placed on a lug of the cooking vessel as described in connection with FIGURES 1–3. The two side members 50 and 51 are squeezed together by hand until the open ended cam slot or groove 56 engages pin 55 under thumb pressure on the cam plate handle 57. The cam plate is then pushed forward to bring members 50 and 51 under resilient tension and finally the pin 55 is locked behind lock notch 58 in the cam groove to hold the handle locked to the pin.

In the embodiment of FIGURE 7 I have illustrated resilient members 71 and 72 of an elongated U-shaped member forming the hand gripping portion of this embodiment. A U-shaped gripping jaw 73 is provided on the end of each member 71 and 72 in the same form as jaw 13 of FIGURES 1–3. A cam plate 74 is provided with cam slots or grooves 75 and 76 engaging cam engaging cam engaging pins 77 and 78 intermediate the ends of each member 71 and 72. A handle 79 is provided on cam plate 74 for rotating it from a first position in which the resilient members 71 and 72 are spaced apart their maximum spacing to a second position in which the gripping jaws are locked onto lug 20 of a cooking vessel as described in respect of FIGURES 1 and 2. The two positions of the resilient members 71 and 72 are controlled by the contour of the cam slots 75 and 76. A locking notch 80 is provided at the end of each groove or slot 75 and 76 to lock the two members 71 and 72 in the second position so as to hold the handle against accidental removal from the vessel lug.

While I have illustrated and described certain preferred embodiments of my invention in the foregoing specification, it will be understood that the invention may be otherwise embodied within the scope of the following claims.

I claim:

1. A detachable handle for cooking vessels having a horizontally extending lug comprising a hand gripping portion including spaced members, a pair of gripping jaws each jaw being integral with one end of a respective spaced member of the hand gripping portion, said gripping jaws having opposed elongated U-shaped members opening toward one another and adapted to be moved toward each other over the edges of the horizontally extending lug of the cooking vessel, cam means pivoted on one spaced member, a cam slot in said cam means, a cam engaging member on the other spaced member engaging the cam slot, said cam means having a portion extending between said spaced members, a finger piece on said cam for operating said cam, said cam adapted to be moved relatively to said spaced members to move the spaced members toward each other and the gripping jaws from a first position in which said jaws are adapted to pass over the vessel lug to a second position in which the gripping jaws engage the lug under pressure, and cam locking means in the cam slot including a recess into which the cam engaging member snaps to lock the spaced members under pressure.

2. A detachable handle for cooking vessels having a horizontally extending lug comprising a hand gripping portion including spaced members, a pair of gripping jaws each jaw being integral with one end of a respective spaced member of the hand gripping portion, said gripping jaws having opposed elongated U-shaped members opening toward one another and adapted to be moved toward each other over the edges of the horizontally extending lug of the cooking vessel, cam means pivoted between said spaced members, spaced cam slots in said cam means, a cam engaging member on said spaced members engaging the slots in said cam means, said cam means extending between said spaced member and adapted to be rotated relatively thereto to move the spaced members toward each other and the gripping jaws from a first position in which said jaws are adapted to pass over the vessel lug to a second position in which the gripping jaws engage the lug under pressure, a finger piece for rotating said cam means and cam locking means in each cam slot including a recess into which said cam engaging members snap to lock the spaced members under pressure.

3. A detachable handle for cooking vessels having a horizontally extending lug comprising a hand gripping portion including spaced members, a pair of gripping jaws each jaw being integral with one end of a respective spaced member of the hand gripping portion, said gripping jaws having opposed elongated U-shaped members opening toward one another and adapted to be moved toward each other over the edges of the horizontally extending lug of the cooking vessel, cam means pivoted on one spaced member, a cam slot in said cam means open at one end, a cam engaging member on the other spaced member engageable in the slot in the cam means, said cam means having a portion extending between said spaced member and adapted to be moved relatively thereto the engage the cam slot on said cam engaging means to move the spaced members toward each other and the gripping jaws from a first position in which said jaws are adapted to pass over the vessel lug to a second position in which the gripping jaws engage the lug under pressure, a finger piece on said cam for moving said cam and a cam locking recess at the end of the cam slot remote from the open end into which said cam engaging means snaps to lock the spaced members under pressure.

References Cited by the Examiner

UNITED STATES PATENTS

| | | | |
|---|---|---|---|
| 2,536,873 | 1/1951 | Culp | 294—99 X |
| 2,607,619 | 8/1952 | Ames | 294—99 X |

MARVIN A. CHAMPION, *Primary Examiner.*

GERALD M. FORLENZA, *Examiner.*

G. F. ABRAHAM, *Assistant Examiner.*

UNITED STATES PATENT OFFICE
CERTIFICATE OF CORRECTION

Patent No. 3,285,648                      November 15, 1966

Vaughn K. Pryce

It is hereby certified that error appears in the above numbered patent requiring correction and that the said Letters Patent should read as corrected below.

Column 2, line 35, for "FIG" read -- FIG. --; line 66, for "planef rom" read -- plane from --; column 4, line 39, for "there-" read -- thereto --; line 40, strike out "the", first occurrence.

Signed and sealed this 12th day of September 1967.

(SEAL)
Attest:

ERNEST W. SWIDER                      EDWARD J. BRENNER
Attesting Officer                            Commissioner of Patents